Dec. 16, 1969   B. R. NICHOLS   3,484,298
ELECTRODE BACKING PLATE FOR ELECTROCHEMICAL CELLS
Filed May 16, 1967
3 Sheets-Sheet 1
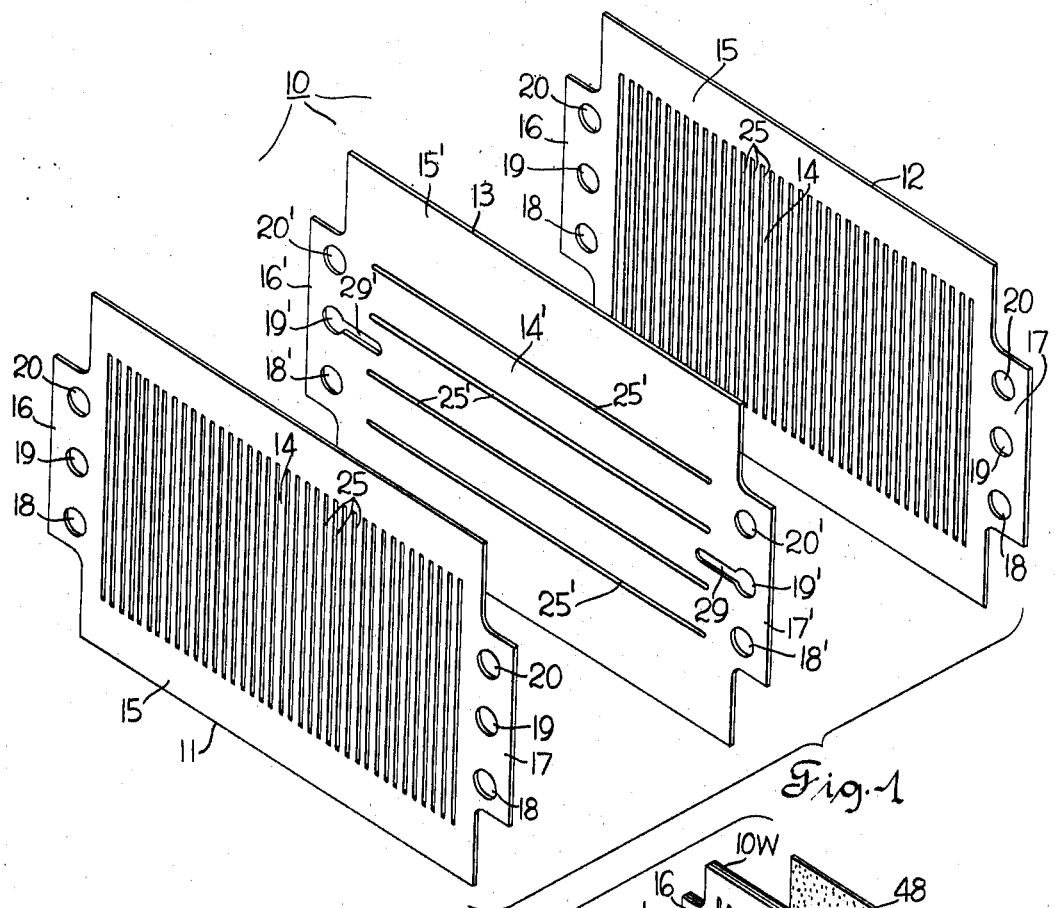
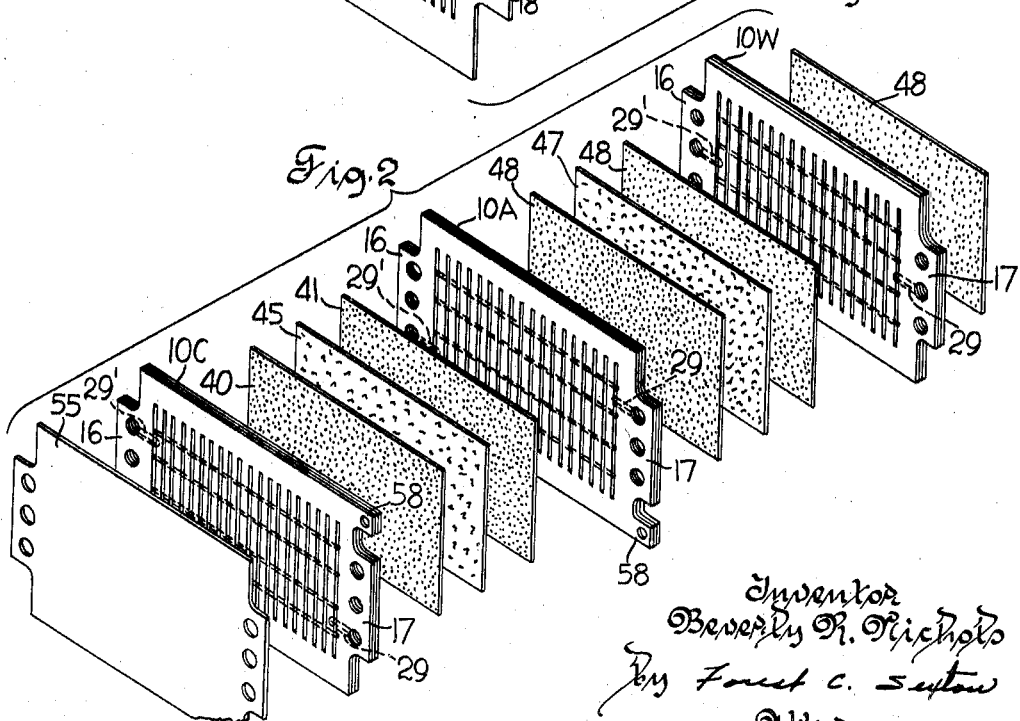
Inventor
Beverly R. Nichols
By Forest C. Sexton
Attorney Dec. 16, 1969      B. R. NICHOLS      3,484,298
ELECTRODE BACKING PLATE FOR ELECTROCHEMICAL CELLS
Filed May 16, 1967      3 Sheets-Sheet 2

Inventor
Beverly R. Nichols
by Forest C. Sexton
Attorney

Dec. 16, 1969  B. R. NICHOLS  3,484,298
ELECTRODE BACKING PLATE FOR ELECTROCHEMICAL CELLS
Filed May 16, 1967  3 Sheets-Sheet 3

Inventor
Beverly R. Nichols
By Forest C. Sutton
Attorney 3,484,298
ELECTRODE BACKING PLATE FOR ELECTROCHEMICAL CELLS
Beverly R. Nichols, Elm Grove, Wis., assignor to Allis-Chalmers Manufacturing Company, Milwaukee, Wis.
Filed May 16, 1967, Ser. No. 638,883
Int. Cl. H01m 27/04, 13/02
U.S. Cl. 136—120      11 Claims

ABSTRACT OF THE DISCLOSURE

A laminated, 3-sheet, backing plate for fuel cell electrodes providing a gas distribution and product removal grid on each face thereof. The grid comprises a plurality of elongated slits in each outer sheet which communicate with at least one elongated slit in the intermediate sheet transverse thereto. A plurality of apertures are provided through the laminated structure to feed reactants to the elongated slit in the intermediate sheet and to remove reaction products thereform.

BACKGROUND OF THE INVENTION

This invention relates to electrochemical cells and more particularly, this invention relates to a gaseous distribution means for such cells. In particular, this invention relates to electrode backing plates that provide for the supply and exhaust of reactants to and from the reaction sites within electrochemical cells.

Devices for the direct production of electrical energy from chemical energy by electrochemical means are commonly known as fuel cells.

An individual fuel cell is ordinarily made up of a cell container, two conducting porous electrodes consisting of or impregnated with a material having a catalytic effect upon the desired electrochemical reactions, an electrolyte situated between and in contact with the electrodes, connecting means associated with an external circuit, means for introducing an oxidizing gas to a cathode, means for introducing a fuel to an anode, and means for removal of by-product water from the fuel cell.

Design considerations dictate that the electrode configuration employed be that which permits the most effective utilization of the available cell space. For most applications, relatively thin, flat, plate type electrodes are employed which permit stacking of the fuel elements. This arrangement provides the most advantageous use of space in relation to the output of the fuel element.

In operation, the oxidizing gas and the fuel gas are introduced under pressure through the backs of the porous electrodes. As the thin, porous electrodes generally have limited physical strength, the electrodes are supported by backing plates. The backing plate that is employed may, in addition to providing physical support for the electrodes, provide means for uniform distribution of the gaseous reactants over the back surface of the porous electrode as well as serving as a means for providing electrical contact of the cell electrodes with the external circuit. The opposite side of the electrode is adapted to be in contact with an ion-conducting electrolyte.

The electrode backing plate is generally a flat, thin plate made of or plated with a corrosion resistant metal such as nickel, gold, silver or the like. On the surface of the electrode backing plate a network of channels provide a means for supplying fresh reactant gas to the backs of the electrodes and means for removing accumulated inert gases and water vapor product.

Electrode backing plates which have heretofore been advantageously employed, are solid metal plates having formed on at least one face thereof, a series of interconnecting recesses or grooves forming a grid gas distribution network which provides uniform gas distribution over the back surface of the electrode. Ports drilled on opposite ends of the plates provide a means whereby a suitable manifold structure may be connected to the plates to supply reactants and to exhaust accumulated inert gases and the like from the fuel cell. Apertures machined in the inner circumference of the ports and extending through the inner body of the plate and communicating with the distribution grid provide connecting passageways for the entry and delivery of reactants to the gas distribution network and exits for the removal of exhaust products.

The machining of the grooved network on the face of the backing plate and the passageways contained in the inner body connecting therewith is an intricate and costly procedure. The art therefore, is continually seeking electrode backing plates for fuel cells which will provide adequate support for the electrode and distribution of the fuel cell reactants which can be manufactured by simple and economical techniques.

SUMMARY OF THE INVENTION

In accordance with the present invention, there is provided an electrode backing plate for fuel cells having a laminated structure which makes possible the forming of all grooves, holes and the like by punching, stamping or the like. Such techniques are of course, more economical than machining. The laminated electrode backing is comprised of three plates bonded together with a suitable adhesive.

The laminated electrode backing plate of the present invention can be made from materials which are formed by simple stamping procedures, thus eliminating costly and intricate machining methods, to create the gas distribution system and interconnecting entrance and exit channels.

BRIEF DESCRIPTION OF THE DRAWINGS

The electrode backing plate of the present invention will be more fully understood by reference to the accompanying drawings in which:

FIG. 1 illustrates an exploded isometric view of the individual plates of the laminated electrode backing plate of the present invention prior to assembly;

FIG. 2 is an exploded isometric view of a single cell fuel cell assembly incorporating three laminated electrode backing plates constructed in accordance with this invention;

DESCRIPTION OF THE PREFERRED EMBODIMENT

Figure 3:
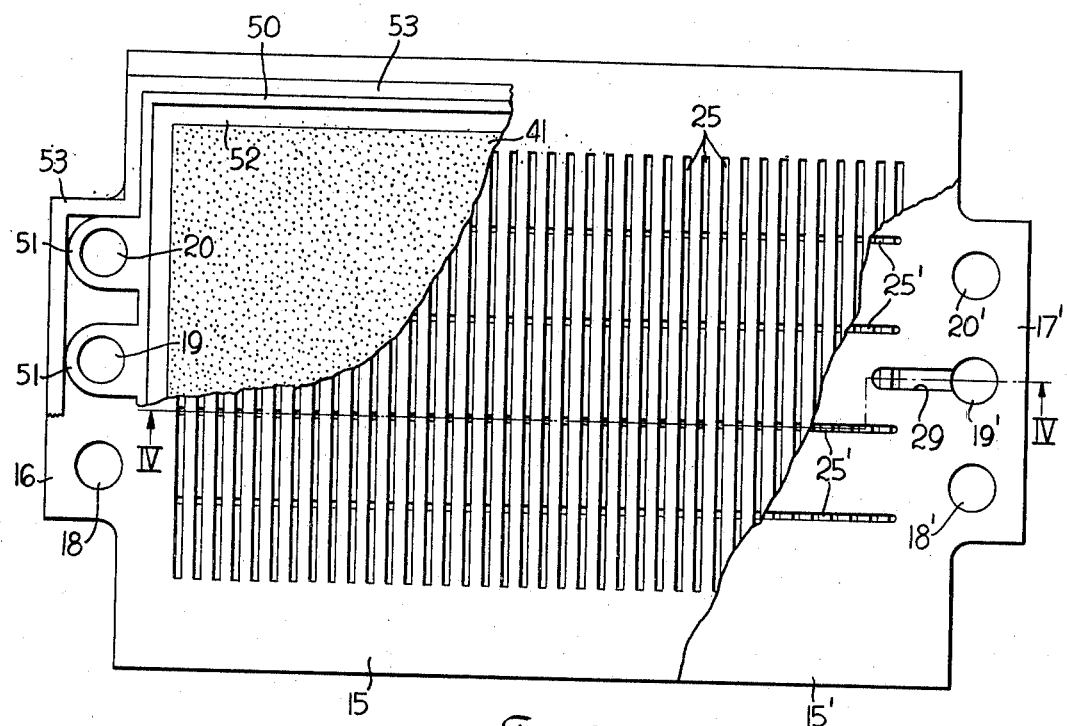
FIG. 3 is a plan view of the laminated electrode backing plate of the present invention having an electrode assembly mounted thereon, the electrode assembly as well as one outer plate is partially broken away to show the gas distribution means of the holder.
Figure 4:
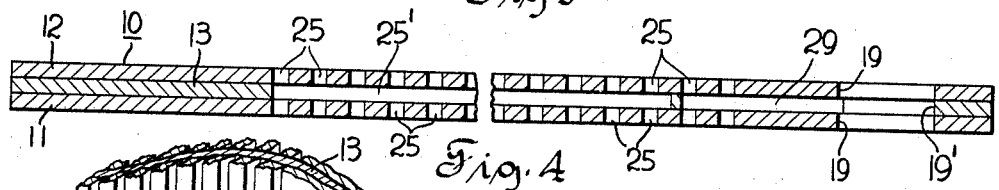
FIG. 4 is a cross-sectional view of the platet assembly taken along line IV—IV of FIG. 3.
Figure 5:
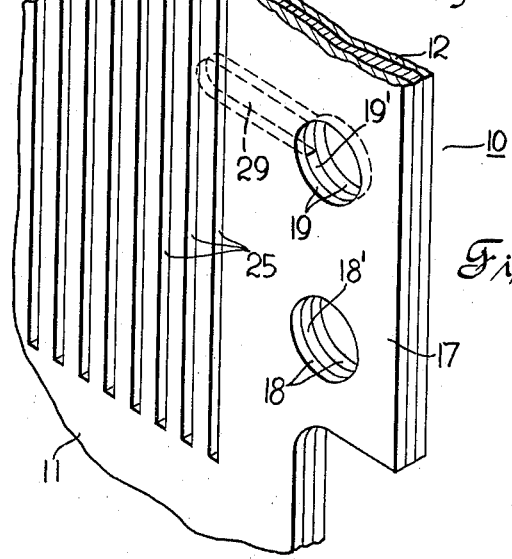
FIG. 5 is a partial perspective view of the laminated electrode backing plate of the present invention.

Referring now to the drawings, the laminated electrode backing plate 10 of the present invention is comprised of three flat sheets bonded together. The two outer sheets 11, 12 of the laminated plate 10 are bonded to opposite sides of the center or intermediate sheet 13. The outer plates 11, 12 of the laminated plate 10 may be bonded to the intermediate plate 13 using an adhesive or bonding agent that is chemically inert or resistant to the reactants, exhausts products and electrolyte of the electrochemical cell. Adhesive materials of various kinds may be used for this purpose.

The outer sheets 11 and 12 of the laminated plate 10 are constructed from or platetd with an electrically conductive material that is inert toward the corrosive effect of the reactant and exhaust gases as well as the fuel cell electrolyte. For example, if a lightweight material is desired, the sheets may be made of magnesium and plated with nickel, silver, gold or the like. If further reduction in weight or cost of matetrial is desired, center plate 13 may be made of a plastic such as polypropylene bonded to plates 11 and 12, which could be manufactured as described above.

The outer sheets 11, 12 of the laminated electrode backing plate are of substantially identical construction wherein each is a flat sheet or plate having body portion 14 and a peripheral portion 15. At the two extremities of the frame portion 15 are projections 16 and 17 in which are locatetd any number of apertures to provide entrance and exit ports for the manifold supply and purge of fuel cell reactants and accumulated inert gases from the working fuel cell. In the particular embodiment shown in the drawings, each of the projections 16 and 17 contain apertures 18, 19 and 20.

The body portion 14 of the outer sheets 11 and 12 contain continuous openings or elongated slits 25. The slits 25 run substantially parallel to each other and substantially parallel to the edge of the sheet on which projections 16 and 17 are located.

In a like fashion, intermediate sheet 13 has a body portion 14' and a peripheral portion 15'. At the two extremities of frame portion 15' are projections 16' and 17' which correspond in construction with projections 16 and 17 on outer sheets 11 and 12. Located within projections 16' and 17' are apertures 18', 19' and 20' which will align with apertures 18, 19 and 20 through outer sheets 11 and 12. Accordingly, when sheets 11, 12 and 13 are bonded together to form a completed backing plate 10, apertures 18–18', 19–19' and 20–20' will be aligned with similar apertures in adjoining backing plates to form separate manifolds for the incoming fuel and oxidizing gas, and the outgoing products of combustion.

The central portion of intermediate sheet 13 is provided with a plurality of substantially equally spaced slits 25'. These slits 25' are substantially parallel to each other and transverse to the slits 25 in sheets 11 and 12. Therefore, when the outer sheets 11 and 12 are bonded to the intermediate sheet 13, a gas distribution grid is formed by the transverse overlapping of slits 25 over slits 25'. In the completed fuel cell this gas distribution grid will provide a network of gas distribution passageways for the reactants from the internal slits 25, 25' to the fuel cell electrodes 40, 41 adjacent thereto. This network construction promotes intimate and uniform contact between the electrode surface and the fluid flowing into or out of the cell.

In the embodiment shown in the drawings, one aperture in each projection 16' and 17' is provided with at least one slotted extension 29, 29' heading away from that particular aperture and into the central portion 14'. The slotted extensions 29, 29' must be of sufficient length so that it will transversely intersect at least one slit 25 on each of sheets 11 and 12 when all sheets are bonded together to form a backing plate 10. Accordingly, when sheets 11 and 12 are bonded to intermediate sheet 13, each slotted extension 29, 29' forms a channel extending between one of the apertures 18–18', 19–19' or 20–20' and the grid formed by slits 25 and 25'. Thus, the channel formed by slotted extensions 29, 29' serves to feed a reactant into the grid or remove a product of combustion from the grid. Of course, if only one slot 25' is provided in intermediate sheet 13, then the slotted extensions 29, 29' can be directly extended into the slot 25'.

It is apparent that each slotted extension 29, 29' must be associated with different apertures depending upon which types electrode the particular backing plate 10 will be associated with. That is to say, these slotted extensions 29, 29' must be associated with the appropriate incoming manifold at one end and appropriate exhaust manifold at the opposite end so that when placed in a fuel cell only fuel is admitted at the anode backing plate and only oxidizing gas at the cathode backing plate. The products of combustion are then extracted at the opposite end of each backing plate and exhausted through appropriate manifolds. It should be apparent therefore, that in operation, the fuel and the oxidizing gas will pass into the fuel cell via separate manifolds formed by the apertures in extensions 16–16' and 17–17'. At anode backing plate, the fuel will be passed through the channel formed by a slotted extension 29 and into the nearest slit or slits 25 in sheets 11 and 12. From these first slits 25, a small portion of the fuel is absorbed into the adjacent electrode, while a major portion of the fuel passes from these outer slits 25 into the interior slits 25' in interior sheet 13. The remaining slits 25 in sheets 11 and 12 are then fed from these interior slits 25'. Any products of combustion other than water or any accumulated inert gases are forced through the channel formed by the slotted etxension 29' at the opposite end of the backing plate. The process is identical within the cathode backing plate except that the oxidizing gas is admitted thereinto instead of fuel. Water removal, which takes place from the anode backing plate, will be described subsequently.

Figure 6:
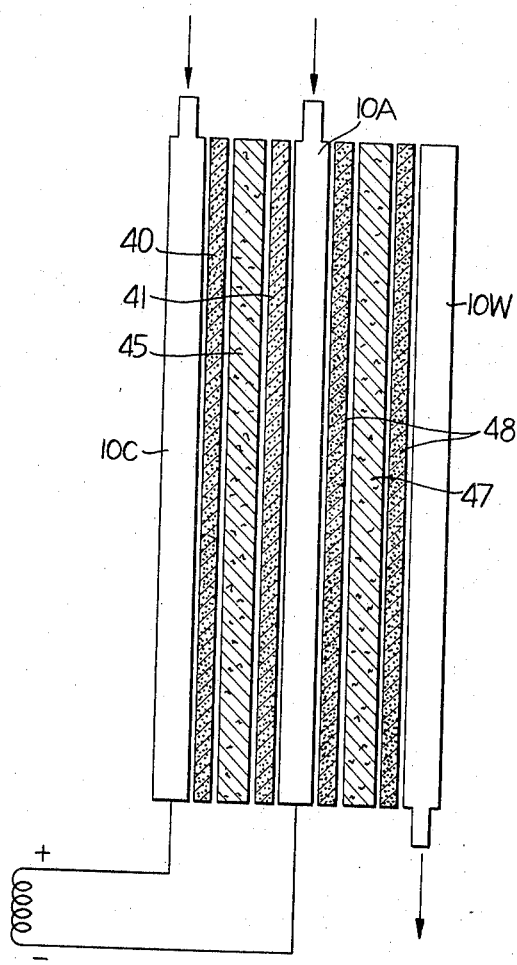
FIG. 6 is a schematic illustration of the single cell assembly shown in FIG. 2.

FIG. 6 illustrates the construction of an individual fuel cell unit embodying the backing plate of this invention. As shown in the drawing, a cathode backing plate 10C and an anode backing plate 10A must be spaced apart and parallel. A cathode 40 and an anode 41 spaced apart by an electrolyte containment means 45, are disposed between the two backing plates 10A and 10C. Thus, the cathode is sandwiched between the electrolyte carrier 45 and the gas distribution grid on backing plate 10C, while the anode is sandwiched between the same electrolyte carrier 45 and the anode backing plate 10A.

A continuous, nonconductive, impermeable seal 50 (FIG. 3) is also sandwiched between the two backing plates 10A and 10C around the peripheral portion 15 thereof. The seal 50 should be compressible and thicker than the spacer 52 so as to form liquid and gas tight seal in the space created between the backing plates 10A and 10C. Similar nonconductive impermeable seals must be placed between backing plates 10A and 10C at each of the apertures 18–18', 19–19' and 20–20' to form continuous gas tight manifolds through adjoining backing plates. As shown in FIG. 3 the seal 50 may be a one piece unit including the aperture seals 51 on the periphery thereof.

As shown in FIG. 3 a continuous asbestos seal 52 may be placed around the electrodes 40 and 41 and the electrolyte carrier 45 to position the electrodes properly. A rigid spacer 53 may also be disposed between backing plates 10A and 10C, which encircles seal 50, 51 to limit compression of the backing plates 10A and 10C against the electrodes and electrolyte carrier.

The electrodes 40 and 41 may be formed from sintered nickel and can carry any of the many known catalysts that will activate fuel cell reactants. Although the electrolyte containment means 45 may be any of the known conventional electrolyte carriers, a sheet of fibrous asbestos is preferred.

A preferred embodiment of this invention may utilize a water removal system as illustrated in FIGS. 2 and 6. In such an embodiment, a third laminated backing plate 10W is secured against the other side of the anode backing plate 10A in the same manner as the cathode backing plate 10C opposed thereto. A suitable moisture removal membrane 47, sandwiched between a pair of porous support plaques 48 is disposed between the backing plates 10A and 10W and sealed therein in much the same way as the electrodes 40 and 41 and electrolyte carrier means 45 are disposed and sealed between backing plates 10A and 10C.

The schematic diagram of FIG. 6 illustrates the general operation of such a single cell unit. In practical applications of course, a plurality of such cells would be placed face to face to make up a multicell power source. The outermost backing plates would be covered by a sealing end plate 55 as shown in FIG. 2.

Electrical current may be drawn from composite lugs 58 formed in the vicinity of projections 16 or 17. The lug 58 may have an aperture as shown for the reception of a suitable current carrying means to the external load.

It should be apparent that numerous modifications and additional features could be made and incorporated into the embodiment detailed above without departing from the basic concept of this invention. Accordingly, it should be understood that this invention should not be limited to the details given herein, but may be modified within the scope of the appending claims.

The embodiments of the invention in which an exclusive property or privilege is claimed are defined as follows:

1. A laminated electrode backing plate for electrochemical cells comprising an intermediate sheet sandwiched between and bonded to a pair of outer sheets, said intermediate sheet having at least one elongated slit, said outer sheets having a plurality of elongated slits communicating with and transverse to the elongated slit in said intermediate sheet, and means for exhausting reaction products from the elongated slit in said intermediate sheet.

2. A laminated electrode backing plate according to claim 1 further comprising a means for admitting a reactant to the elongated slit in said intermediate sheet.

3. A laminated electrode backing plate according to claim 1 wherein said plurality of elongated slits in said outer sheets are substantially parallel to each other in a spaced relation.

4. A laminated electrode backing plate according to claim 1 wherein said plurality slits in said outer sheets perpendicularly communicate with the elongated slit in the intermediate sheet.

5. A laminated electrode backing plate according to claim 1 wherein said elongated slit in said intermediate sheet comprises a plurality of substantially parallel elongated slits, each communicating with and transverse to the plurality of elongated slits in said outer sheets.

6. A laminated electrode backing plate according to claim 2 wherein said means for admitting a reactant to the elongated slit in said intermediate sheet comprises an aperture in the intermediate sheet, an aperture in each of said outer sheets such that all three apertures will be aligned when the sheets are bonded together to form an inlet manifold and a channel means communicating between said manifold and said elongated slot in said intermediate sheet to convey the reactant from said manifold to said elongated slot in said intermediate sheet.

7. A laminated electrode backing plate according to claim 6 wherein said channel means comprises a slotted extension in said intermediate sheet communicating between said aperture in said intermediate sheet and said elongated slot in said intermediate sheet.

8. A laminated electrode backing plate according to claim 6 wherein said channel means comprises a slotted extension in said aperture through said intermediate sheet, the slotted extension being of sufficient length to communicate transversely with at least one of the elongated slits in each outer sheet.

9. A laminated electrode backing plate according to claim 1 wherein said means for exhausting reaction products from the elongated slit in said intermediate sheet comprises an aperture in said intermediate sheet, an aperture in each of said outer sheets such that all three apertures will be aligned when the plates are bonded together to form an outlet manifold, and a channel means communicating between said outlet manifold and said elongated slot in said intermediate sheet to convey the reaction products from said elongated slot in said intermediate sheet to the outlet manifold.

10. A laminated electrode backing plate according to claim 9 wherein said channel means comprises a slotted extension in said intermediate sheet communicating between said aperture in said intermediate sheet and said elongated slot in said intermediate sheet.

11. A laminated electrode backing plate according to claim 9 wherein said channel means comprises a slotted extension in said aperture through said intermediate sheet, the slotted extension being of sufficient length to communicate transversely with at least one of the elongated slits in each outer sheet.

References Cited

UNITED STATES PATENTS 3,395,047   7/1968   Terry et al. _____ 136—86

FOREIGN PATENTS 1,481,318   4/1967   France.

WINSTON A. DOUGLAS, Primary Examiner
M. J. ANDREWS, Assistant Examiner

U.S. Cl. X.R.
136—86